(12) United States Patent
Kobayashi

(10) Patent No.: US 8,351,398 B2
(45) Date of Patent: Jan. 8, 2013

(54) MOBILE COMMUNICATION TERMINAL, INCOMING DATA DETECTING METHOD AND INCOMING DATA DETECTING PROGRAM

(75) Inventor: Yutaka Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/226,579

(22) Filed: Sep. 7, 2011

(65) Prior Publication Data
US 2012/0063416 A1     Mar. 15, 2012

Related U.S. Application Data (63) Continuation-in-part of application No. 12/320,103, filed on Jan. 16, 2009, now abandoned, which is a continuation of application No. PCT/JP2006/314380, filed on Jul. 20, 2006.

(51) Int. Cl.
*H04W 36/30* (2009.01)
*H04W 68/02* (2009.01)

(52) U.S. Cl. ................ 370/332; 370/338; 455/436

(58) Field of Classification Search .......... 370/328, 370/331, 332, 335, 338, 342, 44; 455/422.1, 455/436, 437, 438, 439, 440, 442, 443
See application file for complete search history.

(56) References Cited

U.S. PATENT DOCUMENTS

| | | | |
|---|---|---|---|
| 6,505,058 B1 * | 1/2003 | Willey | 455/574 |
| 6,795,425 B1 | 9/2004 | Raith | |
| 7,076,248 B2 | 7/2006 | Amirijoo et al. | |
| 7,292,551 B2 | 11/2007 | Lim et al. | |
| 7,515,922 B2 | 4/2009 | Kim et al. | |
| 2003/0017842 A1 * | 1/2003 | Moles et al. | 455/552 |
| 2004/0043798 A1 | 3/2004 | Amerga et al. | |

(Continued)

FOREIGN PATENT DOCUMENTS
JP     2000032564 A     1/2000
(Continued)

OTHER PUBLICATIONS
Non-Final Office Action dated Jun. 8, 2011 received in U.S. Appl. No. 12/320,103.
(Continued)

*Primary Examiner* — Chi Pham
*Assistant Examiner* — Ahmed Elallam
(74) *Attorney, Agent, or Firm* — Murphy & King, P.C.

(57) ABSTRACT

Included are a system information receiving unit for receiving, from a first base station or a second base station, system information including a PI within a PICH and a PCH, and a cell reselecting unit for executing a cell reselection process for switching from a wireless communication with the first base station to that with the second base station if a mobile communication terminal fails to obtain local incoming information due to unsuccessful reception of the PCH, which is made by the system information receiving unit, after receiving a notification that incoming data exists by receiving the PI within the system information received by the system information receiving unit within the first service area. Consequently, the mobile communication terminal and incoming data detecting method and program, which can securely receive incoming data even if the mobile communication terminal fails to receive the PCH although receiving incoming information with the PI.

6 Claims, 11 Drawing Sheets

U.S. PATENT DOCUMENTS

| | | |
|---|---|---|
| 2004/0227618 A1 | 11/2004 | Hwang et al. |
| 2005/0048982 A1 | 3/2005 | Roland et al. |
| 2005/0288040 A1 | 12/2005 | Charpentier et al. |
| 2006/0133269 A1 | 6/2006 | Prakash et al. |
| 2009/0129343 A1* | 5/2009 | Kobayashi .................. 370/331 |

FOREIGN PATENT DOCUMENTS

| | | |
|---|---|---|
| JP | 2002374550 A | 12/2002 |
| JP | 2004112148 A | 4/2004 |
| JP | 2005505983 A | 2/2005 |

OTHER PUBLICATIONS

ETSI TS 125 304 v7.0.0 (Mar. 2006) Universal Mobile Telecommunications System (UMTS); User Equipment (UE) procedures in idle mode and procedures for cell reselection in connected mode (3GPP TS 25.304 version 7.0.0 Release 7).

European Office Action dated May 18, 2011 for application No. 06781340.2-412/2046068.

International Search Report in PCT/JP2006/314380 dated Oct. 24, 2006.

* cited by examiner

MOBILE COMMUNICATION TERMINAL, INCOMING DATA DETECTING METHOD AND INCOMING DATA DETECTING PROGRAM

CROSS REFERENCE TO RELATED APPLICATIONS

This application is a continuing-in-part application of U.S. application Ser. No. 12/320,103 which is a continuation application of international PCT application No. PCT/JP2006/314380 filed on Jul. 20, 2006.

BACKGROUND OF THE INVENTION

1. Field of the Invention

The present invention relates to a mobile communication terminal used in a mobile communication system such as a cellular phone system, a wireless LAN, etc., and incoming data detecting method and program, which are executed in the mobile communication terminal, and more particularly, to a mobile communication terminal, which extends a standby time with a discontinuous reception control, in a CDMA (Code Division Multiple Access) system, and incoming data detecting method and program, which are executed in the mobile communication terminal.

2. Description of the Related Art

Conventionally, the battery of a mobile communication terminal is saved with a discontinuous control in a W-CDMA (Wideband CDMA) mobile communication system.

With the discontinuous control, a mobile communication terminal is controlled with a PICH (Paging Indicator CHannel), and a PCH (Paging CHannel) that is a transport channel mapped on an SCCPCH (Secondary Common Control Physical CHannel).

With the PICH, a short PI (Paging Indicator) for notifying a mobile communication terminal of whether or not incoming information exists is transmitted. Only if it is notified to the mobile communication terminal that the incoming data exists, the mobile communication terminal receives the PCH corresponding to the PI. Namely, the mobile communication terminal receives the PICH prior to the reception of the PCH. The PICH is a channel for transmitting PI (Paging Indicator) data for which error correction coding (channel coding) is not made. Then, the mobile communication terminal determines whether or not Paging is made based on the PI data received with the PICH, and executes a decoding/reproduction process for incoming data by receiving the PCH only if the incoming data is determined to exist. As a result, the mobile communication terminal receives the PCH only if it verifies based on the PICH that the incoming data exists. Otherwise, the mobile communication terminal does not receive the PCH.

The discontinuous reception cycle of a frame in which a PI is mapped is specified with broadcast information of a base station as DRX Cycles Length (discontinuous cycle). The mobile communication terminal also executes in parallel a level measurement process for detecting a cell transition upon receipt of a PI. Furthermore, the mobile communication terminal executes a cell search process for detecting a neighboring cell in a suitable cycle in consideration of the influence of current consumption.

For example, the invention disclosed by Japanese Patent Publication No. 2004-112148 uses broadcast information cached beforehand if a CRC (Cyclic Redundancy Check) results in NG (CRC-NG) upon receipt of broadcast information when a handover is made during the standby state of a mobile communication terminal. As a result, both the duration for receiving broadcast information and the operation time are shortened, whereby power consumption can be reduced. Moreover, the length of time required for a cell reselection can be shortened because the cell reselection can be efficiently made in an environment where the cell reselection often occurs. This increases an incoming rate. The cell reselection is an operation for selecting one optimum reception wave when a mobile communication terminal detects a plurality of reception waves during its transition to a standby state.

The timing of making a conventional cell reselection is described here.

Figure 1:
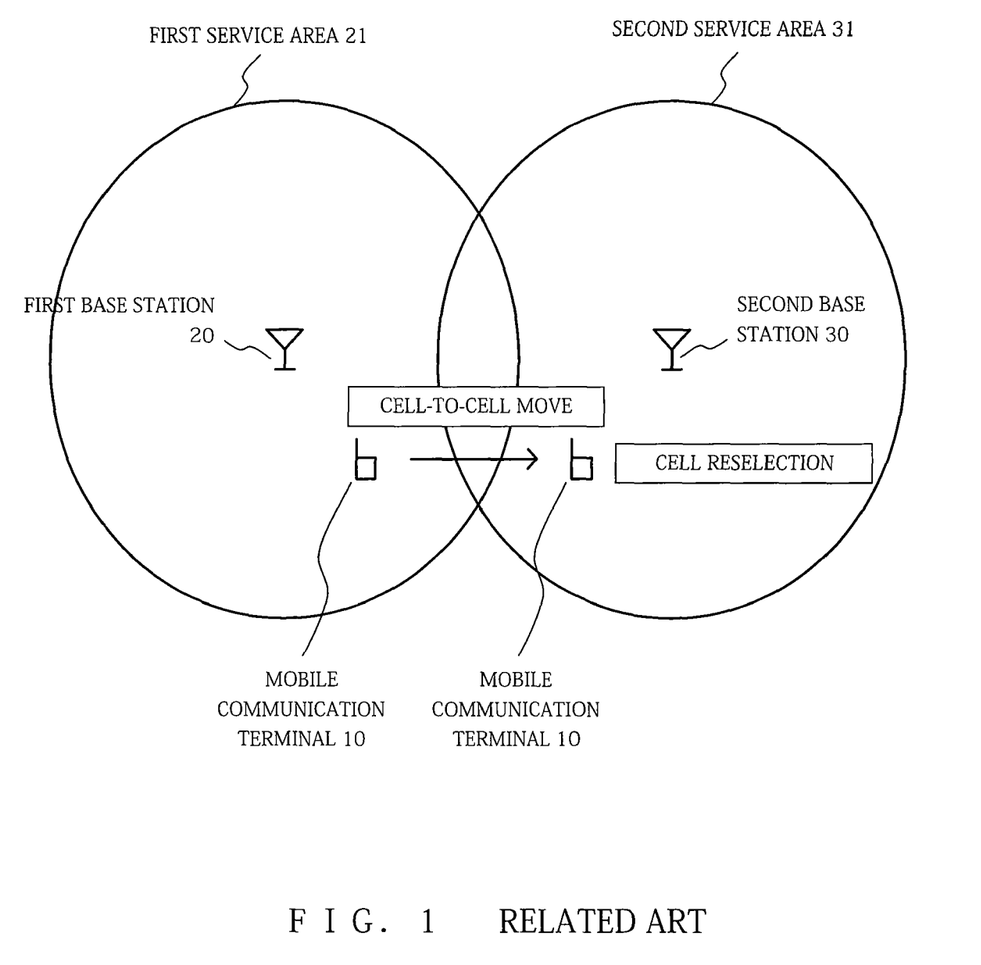
FIG. 1 is a schematic diagram showing a relationship between base stations, service areas, and a mobile communication terminal in conventional technology.
Figure 2:
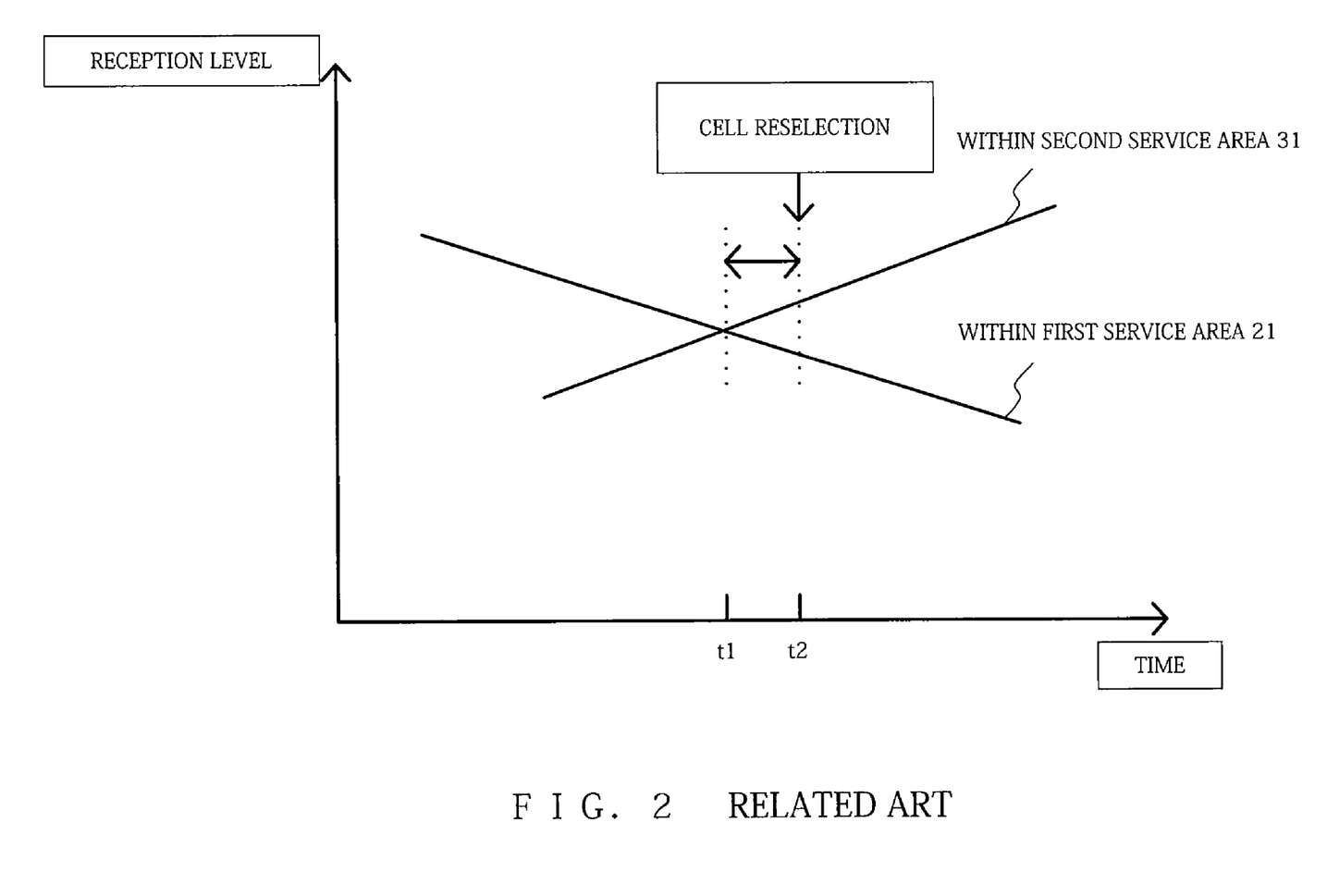
FIG. 2 is a schematic diagram showing a relationship between a reception level and a cell reselection in the conventional technology.

FIG. 1 is a schematic diagram showing a relationship between base stations, service areas, and a mobile communication terminal in conventional technology, whereas FIG. 2 is a schematic diagram showing a relationship between a reception level and a cell reselection in the conventional technology.

In FIG. 1, a mobile communication terminal 10 makes a wireless communication with a first base station 20, which offers a first service area 21, within the first service area 21, and makes a wireless communication with a second base station 30, which offers a second service area 31, within the second service area 31. In an area where the first service area 21 and the second service area 31 overlap, the mobile communication terminal 10 can make a wireless communication with the first base station 20 or the second base station 30 by receiving Paging from the first base station 20 or the second base station 30 in accordance with the position of the mobile communication terminal 10.

When the mobile communication terminal 10 moves from the first service area 21 to the second service area 31, a reception level from the first base station 20 within the first service area 21 drops with the elapse of time during which the mobile communication terminal 10 is moving from the first service area 21 to the second service area 31, and a reception level from the second base station 30 within the second service area 31 rises with the elapse of time during which the mobile communication terminal 10 is moving from the first service area 21 to the second service area 31.

While the reception level within the first service area 21 is higher than that within the second service area 31, the mobile communication terminal 10 makes a wireless communication with the first base station 20. Also in a time period from a time t1 at which the reception level within the first service area 21 and that within the second service area 31 are reversed to a time t2 at which the reception level within the second service area 31 becomes higher than that within the first service area 21 by a predetermined value or more, the mobile communication terminal 10 makes a wireless communication with the first base station 20.

At the time t2 when the reception level within the second service area 31 becomes higher than that within the first service area 21 by the predetermined value or more, the mobile communication terminal 10 still makes a cell reselection, and starts to make a wireless communication with the second base station 30.

However, the conventional technology has a problem that the mobile communication terminal cannot receive incoming data if it fails to receive a PCH (CRC-NG) despite receiving incoming information with a PI, for example, when the reception environment (active cell) of the mobile communication terminal is degraded.

Figure 3:
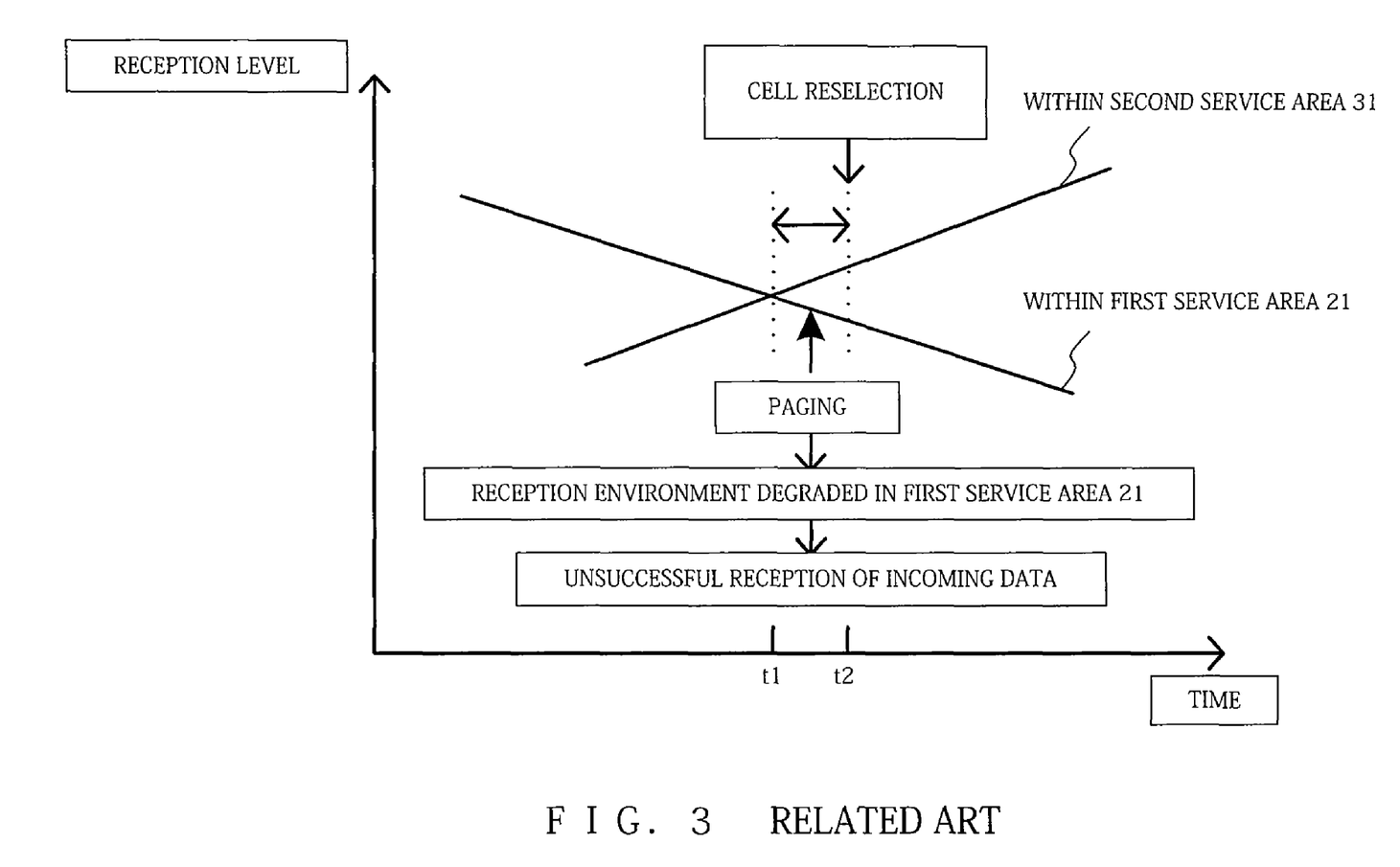
FIG. 3 is a schematic diagram for explaining the case where a mobile communication terminal cannot receive incoming data in the conventional technology.

FIG. 3 is a schematic diagram for explaining the case where the mobile communication terminal cannot receive incoming data in the conventional technology.

As shown in FIG. 3, the mobile communication terminal 10 conventionally fails to receive incoming data by attempting to make a wireless communication with the first base station 20 although its reception environment is degraded by a drop in the reception level within the first service area 21, when Paging from the first base station is made in the time period from the time t1 at which the reception level within the first service area 21 and that within the second service area 31 are reversed to the time t2 at which the reception level within the second service area 31 becomes higher than that within the first service area 21 by the predetermined value or more.

Figure 4:
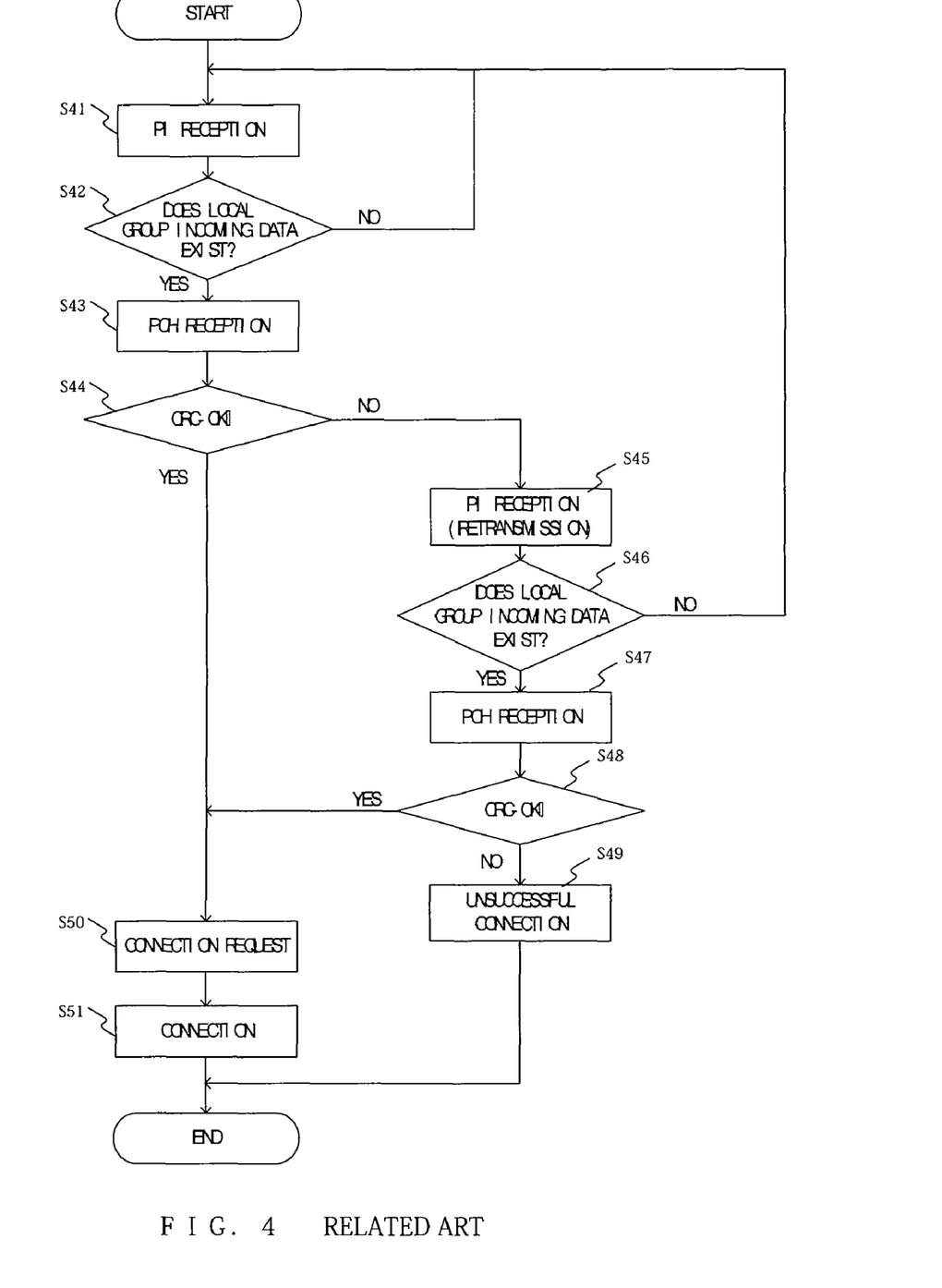
FIG. 4 is a flowchart showing incoming data detection process in the conventional technology.

FIG. 4 is a flowchart showing incoming data detection process executed with the conventional technology.

This process is described by assuming the case where the mobile communication terminal 10 moves from the first service area 21 to the second service area 31.

Initially, in step S41, the mobile communication terminal 10 receives a paging indicator (PI) within a paging indicator channel (PICH) in the first service area 21. The PICH is a channel for transferring a paging indicator that is transmitted to notify that incoming data (local group incoming data) exists for any of mobile communication terminals 10 within a service area offered by a base station from the base station to which the mobile communication terminal 10 registers its position. Then, if the mobile communication terminal determines in step S42 that the local group incoming data exists ("YES" in step S42), it receives a paging channel (PCH) transmitted immediately after (for example, after approximately a little less than two milliseconds) the PI. The PCH is a channel for notifying whether or not local group incoming data is paging to the local mobile communication terminal 10.

Next, if the mobile communication terminal 10 determines that it fails to obtain local incoming information (CRC-NG) due to the unsuccessful reception of the PCH caused by the reception environment degraded by the moving of the mobile communication terminal 10 from the inside of the first service area 21 to its outside ("NO" in step S44), the mobile communication terminal 10 receives a retransmitted PI in step S45. If the mobile communication terminal 10 determines in step S46 that the local incoming data exists ("YES" in step S46), it receives a PCH transmitted immediately after the PI.

If the mobile communication terminal 10 determines in step S48 that it again fails to receive the PCH ("NO" in step S48), it determines in step S49 that a connection is unsuccessfully made.

If the mobile communication terminal 10 determines in S44 or S48 that it successfully receives the PCH (CRC-OK) ("YES" in step S44 or S48), it issues a connection request in step S50, and makes a connection in step S51.

SUMMARY OF THE INVENTION

The present invention was developed in light of the above described circumstances, and aims at providing a mobile communication terminal that can surely receive incoming data even if the mobile communication terminal fails to receive a PCH despite receiving incoming information with a PI, for example, when the reception environment of the mobile communication terminal is degraded, and incoming data detecting method and program, which are executed in the mobile communication terminal.

The present invention adopts the following configuration in order to overcome the above described problem.

Namely, a mobile communication terminal in one aspect of the present invention is a mobile communication terminal that makes a wireless communication with at least one of a first base station offering a first service area and a second base station offering a second service area, and includes a system information receiving unit for receiving, from the first base station or the second base station, system information including a paging indicator (PI) within a paging indicator channel (PICH) and a paging channel (PCH), and a cell reselecting unit for executing a cell reselection process for switching from a wireless communication with the first base station to a wireless communication with the second base station if the mobile communication terminal fails to obtain local incoming information due to unsuccessful reception of the PCH within the system information, which is made by the system information receiving unit, after receiving a notification that incoming data exists by receiving the PI within the first service area.

With this configuration, the probability of obtaining local incoming information of a paging channel retransmitted from the reselected base station can be increased, and an incoming rate can be improved.

Additionally, it is preferable that the mobile communication terminal according to the present invention executes the cell reselection process in a time period from the unsuccessful reception of the PCH, which is made by the system information receiving unit, to the reception of a retransmitted PI.

Furthermore, it is preferable that the mobile communication terminal according to the present invention further comprises a cell searching unit for executing a cell search process for searching for a third service area offered by a third base station except for the first base station and the second base station if the mobile communication terminal can make a wireless communication only with the first base station when it fails to obtain local incoming information (CRC-NG) due to unsuccessful reception of the PCH, which is made by the system information receiving unit, after receiving a notification that incoming data exists by receiving the PI within the system information received by the system information receiving unit within the first service area.

Still further, it is preferable that the cell reselecting unit executes a cell reselection process for switching from the wireless communication with the first base station to a wireless communication with the third base station, if a communication level with the third base station searched by the cell searching unit is higher than that with the first base station in the mobile communication terminal according to the present invention.

An incoming data detecting method in another aspect of the present invention is a method executed in a mobile communication terminal that makes a wireless communication with at least one of a first base station offering a first service area and a second base station offering a second service area, and includes causing a system information receiving unit to receive, from the first base station or the second base station, system information including a paging indicator (PI) within a paging indicator channel (PICH) and a paging channel (PCH), and causing a cell reselecting unit to execute a cell reselection process for switching from a wireless communication with the first base station to a wireless communication with the second base station if the mobile communication terminal fails to obtain local incoming information due to unsuccessful reception of the PCH, which is made by the system information receiving unit, after receiving a notification that incoming data exists by receiving the PI within the system information received by the system information receiving unit within the first service area.

DESCRIPTION OF THE EMBODIMENTS

A preferred embodiment according to the present invention is described below with reference to the drawings.

The overview of the present invention is that a mobile communication terminal securely receives a retransmitted paging channel by switching to a cell more suitable than the currently active cell (cell reselection) even if it fails to obtain local incoming information, which is transmitted to the mobile communication terminal, with a paging channel although it detects that incoming data exists by receiving Paging.

Figure 5:
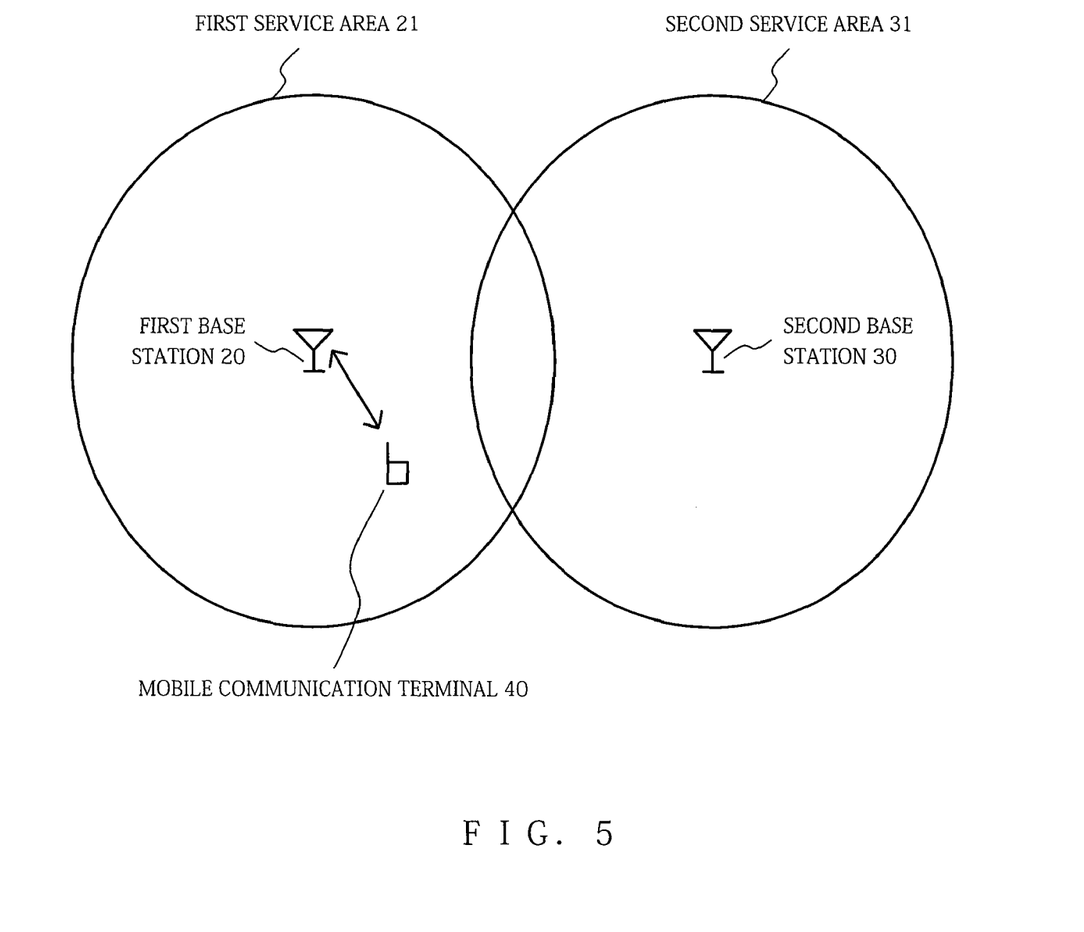
FIG. 5 is a schematic diagram showing a relationship between base stations, service areas, and a mobile communication terminal.

FIG. 5 is a schematic diagram showing a relationship among base stations, service areas, and a mobile communication terminal.

In this figure, similar to the conventional mobile communication terminal 10, the mobile communication terminal 40 makes a wireless communication with the first base station 20, which offers the first service area 21, within the first service area 21, and makes a wireless communication with the second base station 30, which offers the second service area 31, within the second service area 31. In an area where the first service area 21 and the second service area 31 overlap, the mobile communication terminal 40 can make a wireless communication with the first base station 20 or the second base station 30 by receiving Paging transmitted from the first base station 20 or the second base station 30 in accordance with the position of the mobile communication terminal 40, similar to the conventional mobile communication terminal 10.

Figure 11:
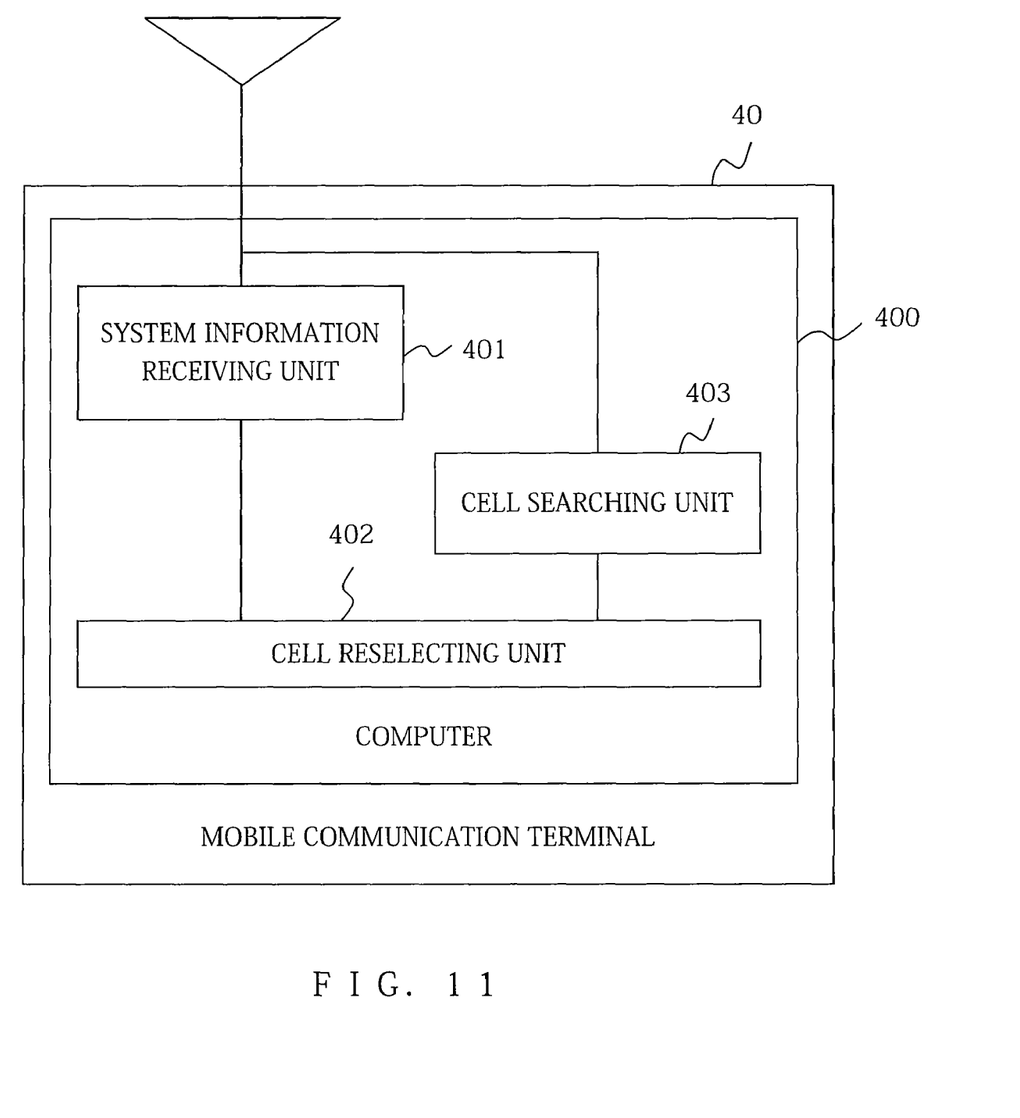
FIG. 11 is a schematic block diagram of a mobile communication terminal according to one embodiment of the present invention.

In one aspect of the present invention, a mobile communication terminal 40 makes a wireless communication with at least one of a first base station 20 offering a first service area 21 and a second base station 30 offering a second service area 31. As depicted in FIG. 11, a computer 400 in the mobile communication terminal 40 includes a system information receiving unit 401 to receive, from the first base station 20 or the second base station 30, system information including a paging indicator (PI) within a paging indicator channel (PICH) and a paging channel (PCH), and a cell reselecting unit 402 to execute a cell reselection process for switching from a wireless communication with the first base station 20 to a wireless communication with the second base station 30 if the mobile communication terminal 40 fails to obtain local incoming information due to unsuccessful reception of the PCH within the system information, which is made by the system information receiving unit 401, after receiving a notification that incoming data exists by receiving the PI within the first service area 21.

Additionally, it is preferable that the computer 400 in the mobile communication terminal 40 executes the cell reselection process in a time period from the unsuccessful reception of the PCH, which is made by the system information receiving unit 401, to the reception of a retransmitted PI.

Furthermore, it is preferable that the computer 400 in the mobile communication terminal 40 further comprises a cell searching unit 403 to execute a cell search process for searching for a third service area offered by a third base station except for the first base station 20 and the second base station 30 if the mobile communication terminal 40 can make a wireless communication only with the first base station 20 when it fails to obtain local incoming information (CRC-NG) due to unsuccessful reception of the PCH, which is made by the system information receiving unit 401, after receiving a notification that incoming data exists by receiving the PI within the system information received by the system information receiving unit 401 within the first service area 21.

Still further, it is preferable that the cell reselecting unit 402 executes a cell reselection process for switching from the wireless communication with the first base station 20 to a wireless communication with the third base station, if a communication level with the third base station searched by the cell searching unit 403 is higher than that with the first base station 20 in the mobile communication terminal 40.

In another aspect of the present invention, an incoming data detecting method executed by a computer 400 in a mobile communication terminal 40 that makes a wireless communication with at least one of a first base station 20 offering a first service area 21 and a second base station 30 offering a second service area 31, includes causing a system information receiving unit 401 to receive, from the first base station 20 or the second base station 30, system information including a paging indicator (PI) within a paging indicator channel (PICH) and a paging channel (PCH), and causing a cell reselecting unit 402 to execute a cell reselection process for switching from a wireless communication with the first base station 20 to a wireless communication with the second base station 30 if the mobile communication terminal 40 fails to obtain local incoming information due to unsuccessful reception of the PCH, which is made by the system information receiving unit 401, after receiving a notification that incoming data exists by receiving the PI within the system information received by the system information receiving unit 401 within the first service area 21.

Figure 6:
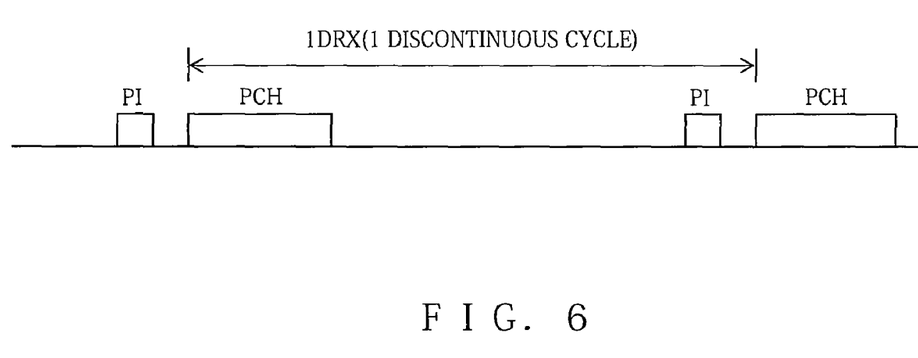
FIG. 6 is a schematic diagram (No. 1) showing a relationship between a PI within a PICH and a PCH.
Figure 7:
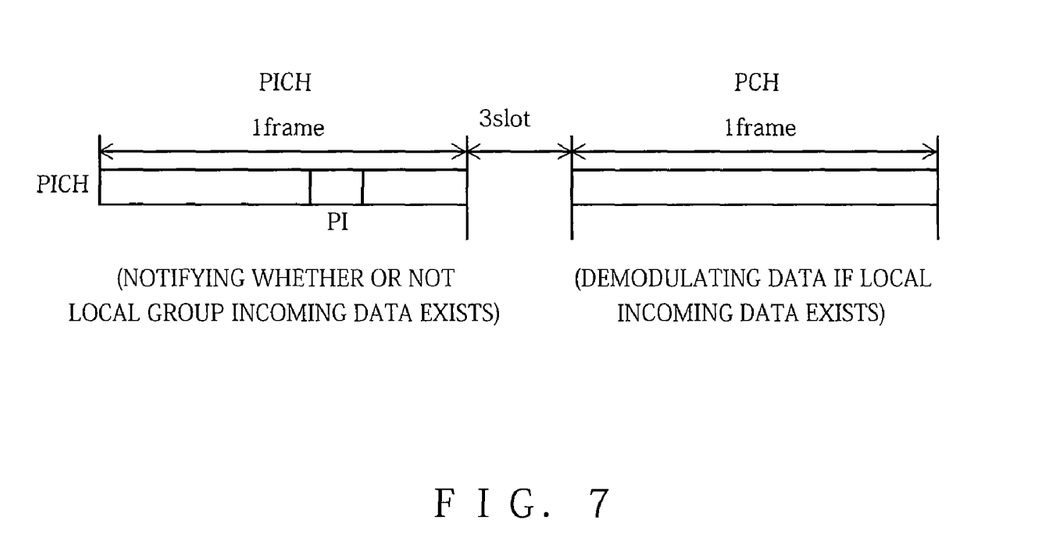
FIG. 7 is a schematic diagram (No. 2) showing a relationship between a PI within a PICH and a PCH.

FIGS. 6 and 7 are schematic diagrams showing a relationship between a PI within a PICH and a PCH.

The mobile communication terminal 40 receives system information including a PI within a PICH, and a PCH from the first base station 20 or the second base station 30. After receiving the PI, the mobile communication terminal 40 receives the PCH after approximately a little less than two milliseconds from the reception of the PI. However, if the mobile communication terminal 40 fails to receive the PCH, it receives a PI and a PCH in each discontinuous cycle (such as 2.56 seconds). The PICH is three slots away from the PCH, and the PI is inserted in the PICH. The mobile communication terminal 40 receives such a PICH and a PCH.

Figure 8:
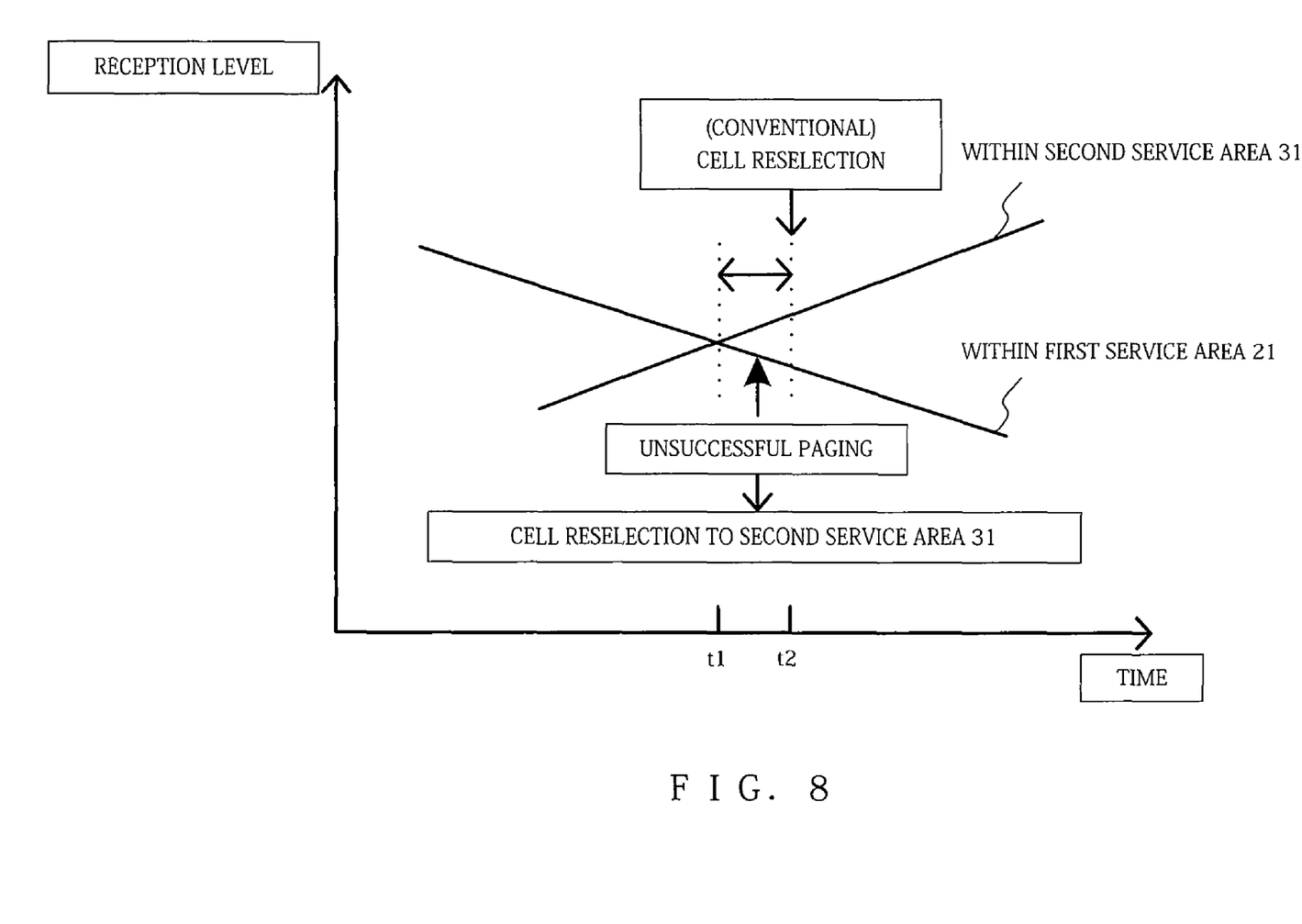
FIG. 8 is a schematic diagram (No. 1) for explaining timing at which a cell reselection is made.
Figure 9:
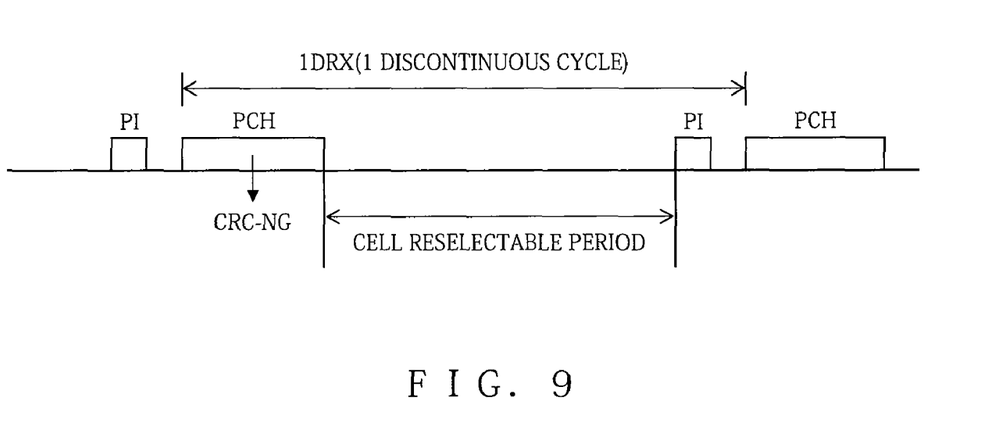
FIG. 9 is a schematic diagram (No. 2) for explaining timing at which a cell reselection is made.

FIGS. 8 and 9 are schematic diagrams for explaining timing at which a cell reselection is made.

As shown in FIG. 8, the mobile communication terminal 40 fails to obtain incoming data by attempting to make a wireless communication with the first base station 20 although its reception environment is degraded by a drop in the reception level within the first service area 21 when Paging is made from the first base station in a time period from a time t1 at which the reception level within the first service area 21 and that within the second service area 31 are reversed to a time t2 at which the reception level within the second service area 31 becomes higher than that within the first service area 21 by a predetermined value or more.

Immediately after this, the mobile communication terminal 40 makes a cell reselection. Namely, the mobile communication terminal 40 executes a cell reselection process for switching from the wireless communication with the first base station 20 to that with the second base station 30 at the stage where the mobile communication terminal 40 fails to obtain local incoming information (CRC-NG) due to unsuccessful reception of the PCH after receiving a notification that incoming data exists by receiving the PI within the received system information within the first service area 21. Thereafter, the mobile communication terminal 40 receives a PI and a succeeding PCH within the switched second service area 31.

Figure 10:
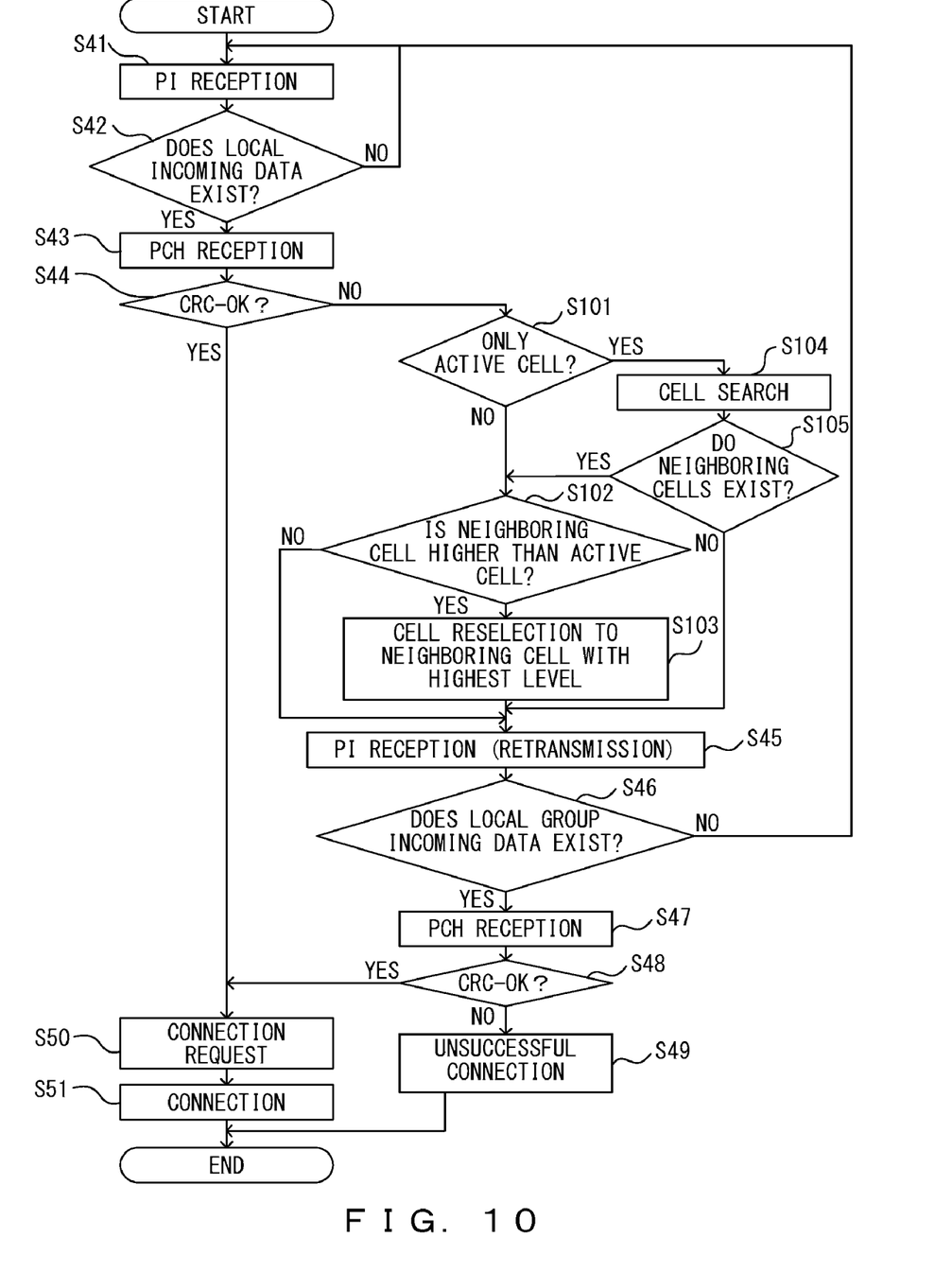
FIG. 10 is a flowchart showing incoming data detection process according to the present invention.

FIG. 10 is a flowchart showing incoming data detection process according to the present invention.

This process is described by assuming the case where the mobile communication terminal 40 moves from the first service area 21 to the second service area 31.

Initially, in step S41, the mobile communication terminal 40 receives a paging indicator (PI) within a paging indicator channel (PICH) in the first service area 21. The PICH is a channel for transferring a paging indicator that is transmitted to notify that incoming data (local group incoming data) exists for any of mobile communication terminals 40 within a service area offered by a base station from the base station to which the mobile communication terminal 40 registers its position. Then, if the mobile communication terminal 40 determines in step S42 that the local group incoming call/data exists ("YES" in step S42), it receives the paging channel (PCH) transmitted immediately after the PI (for example, after approximately a little less than two milliseconds). The PCH is a channel for notifying whether or not the local group incoming data is Paging to the local mobile communication terminal 40.

Next, if the mobile communication terminal 40 determines in step S44 that it fails to obtain the local incoming information (CRC-NG) ("NO" in step S44) due to unsuccessful reception of the PCH caused by the reception environment degraded by the moving of the mobile communication terminal 40 from the inside of the first service area 21 to its outside ("NO" in step S44), it determines whether or not a base station with which the mobile communication terminal 40 can communicate is only the first base station 20 with which the mobile communication terminal 40 is currently making a wireless communication, and whether or not the mobile communication terminal 40 cannot make a wireless communication with the second base station or other base stations (namely, whether or not the mobile communication terminal 40 can communicate only with the active cell). Whether or not the mobile communication terminal 40 can communicate only with the active cell is determined by judging whether or not the number of cells to which a level measurement in a discontinuous state is made is only one cell. The number of active cells is only one cell in the discontinuous state. Therefore, if the number of cells to which the level measurement is made is determined to be two or more, it can be judged that one of the cells is the active cell, and the remaining cells are neighboring cells. Note that the active cell is a service area offered by the base station with which the mobile communication terminal 40 is currently making a wireless communication.

If the mobile communication terminal 40 determines in step S101 that the base station with which the mobile communication terminal 40 can make a communication is not only the active cell ("NO" in step S101), it further determines in step S102 whether or not other neighboring cells (service areas offered by base stations with which the mobile communication terminal 40 is not currently making a wireless communication) with a communication level higher than the active cell exist. If the mobile communication terminal 40 determines that the other neighboring cells with the communication level higher than the active cell exist ("YES" in step S102), it executes the cell reselection process to the neighboring cell (for example, the second service area 31 offered by the second base station 30) with the highest reception level among the neighboring cells in step S103.

In the meantime, if the mobile communication terminal 40 determines in step S101 that the base station with which the mobile communication terminal 40 can make a communication is only the active cell, namely, if the mobile communication terminal 40 can make a wireless communication only with the first base station 20 ("YES" in step S101) when it fails to obtain local incoming information (CRC-NG) due to unsuccessful reception of the PCH after receiving a notification that incoming data exists by receiving the PI within the first service area 21, the mobile communication terminal 40 executes a cell search process for searching for another base station with which the mobile communication terminal 40 can make a wireless communication except for the first base station 20, by way of example, for a third service area offered by a third base station except for the first base station 20 and the second base station 30 in step S104. If the mobile communication terminal 40 determines in step S105 that other base stations with which the mobile communication terminal 40 can make a wireless communication exist except for the first base station 20 ("YES" in step S105), other neighboring cells with their communication level higher than the active cell are determined to exist in step S102. Therefore, the mobile communication terminal 40 executes the cell reselection process to the third service area offered by the third base station in step S103.

Then, in step S45, the mobile communication terminal 40 receives a PI that is retransmitted after the cell reselection process. If the mobile communication terminal 40 determines in step S46 that local group incoming data exists ("YES" in step S46), it receives the PCH transmitted immediately after the PI in step S47.

If the mobile communication terminal 40 determines that it again fails to receive the PCH in step S48 ("NO" in step S48), it determines that a connection is not made in step S49.

In the meantime, if the mobile communication terminal 40 determines that it successfully receives the PCH (CRC-OK) in step S44 or S48 ("YES" in step S44 or S48), it issues a connection request in step S50, and makes a connection in step S51.

The embodiment according to the present invention has been described above with reference to the drawings. However, the present invention is not limited to the above described embodiment, and can adopt various configurations or forms within a scope that does not depart from the gist of the present invention.

According to the present invention, the probability of successfully receiving a PCH that is retransmitted, for example, when a reception environment is degraded, whereby an incoming rate can be improved.

What is claimed is:

1. A mobile communication terminal that makes a wireless communication with at least one of a first base station offering a first service area and a second base station offering a second service area, comprising:

a system information receiving unit for receiving, from the first base station or the second base station, system information including a paging indicator (PI) within a paging indicator channel (PICH) and a paging channel (PCH); and a cell reselecting unit for executing a cell reselection process for switching from a wireless communication with the first base station to a wireless communication with the second base station if the mobile communication terminal fails to obtain local incoming information due to unsuccessful reception of the PCH, which is made by the system information receiving unit, after receiving a notification that incoming data exists by receiving the PI within the system information received by the system information receiving unit within the first service area.

2. The mobile communication terminal according to claim 1, wherein the cell reselecting unit executes the cell reselection process in a time period from the unsuccessful reception of the PCH, which is made by the system information receiving unit, to reception of a retransmitted PI.

3. The mobile communication terminal according to claim 1, further comprising a cell searching unit for executing a cell search process for searching for a third service area offered by a third base station except for the first base station and the second base station, if the mobile communication terminal can make a wireless communication only with the first base station when the mobile communication terminal fails to obtain local incoming information due to unsuccessful reception of the PCH, which is made by the system information receiving unit, after receiving a notification that incoming data exists by receiving the PI within the system information received by the system information receiving unit within the first service area.

4. The mobile communication terminal according to claim 3, wherein the cell reselecting unit executes a cell reselection process for switching from the wireless communication with the first base station to a wireless communication with the third base station, if a communication level with the third base station searched by the cell searching unit is higher than a communication level with the first base station.

5. Incoming data detecting method executed by a mobile communication terminal that makes a wireless communication with at least one of a first base station offering a first service area and a second base station offering a second service area, the method comprising:

receiving, from the first base station or the second base station, system information including a paging indicator (PI) within a paging indicator channel (PICH) and a paging channel (PCH) by a system information receiving unit of the mobile communication terminal; and executing by a cell reselecting unit of the mobile communication terminal a cell reselection process for switching from a wireless communication with the first base station to a wireless communication with the second base station if the mobile communication terminal fails to obtain local incoming information due to unsuccessful reception of the PCH, which is made by the system information receiving unit, after receiving a notification that incoming data exists by receiving the PI within the system information received by the system information receiving unit within the first service area.

6. A non-transitory recording medium having stored therein a program for causing a computer of a mobile communication terminal, which makes a wireless communication with at least one of a first base station offering a first service area and a second base station offering a second service area, to execute an incoming data detecting process comprising:

receiving, from the first base station or the second base station, system information including a paging indicator (PI) within a paging indicator channel (PICH) and a paging channel (PCH) by a system information receiving unit of the computer; and executing by a cell reselecting unit of the computer a cell reselection process for switching from a wireless communication with the first base station to a wireless communication with the second base station if the mobile communication terminal fails to obtain local incoming information due to unsuccessful reception of the PCH, which is made by the system information receiving unit, after receiving a notification that incoming data exists by receiving the PI within the system information received by the system information receiving unit within the first service area.

* * * * *